United States Patent [19]

Geiger

[11] Patent Number: 4,966,474
[45] Date of Patent: Oct. 30, 1990

[54] LOCKABLE NUT FOR AXIAL ADJUSTMENT

[75] Inventor: Robert E. Geiger, Sayre, Pa.

[73] Assignee: Ingersoll-Rand Company, Woodcliff Lake, N.J.

[21] Appl. No.: 359,557

[22] Filed: Jun. 1, 1989

[51] Int. Cl.⁵ ............................................. F16C 1/00
[52] U.S. Cl. ..................................... 384/517; 403/24; 403/320
[58] Field of Search ............... 415/131, 132; 384/540, 384/542, 538, 517, 551; 411/230, 279, 286, 291; 403/320, 24

[56] References Cited

U.S. PATENT DOCUMENTS

| | | | |
|---|---|---|---|
| 1,214,062 | 1/1917 | North | 384/540 |
| 2,332,684 | 10/1943 | Armitage | 411/279 X |
| 3,915,523 | 10/1975 | Shank | 403/320 X |
| 4,557,652 | 12/1985 | Lundgren | 411/230 |

FOREIGN PATENT DOCUMENTS

| | | | |
|---|---|---|---|
| 982462 | 1/1951 | France | 411/291 |
| 726375 | 4/1980 | U.S.S.R. | 411/286 |

*Primary Examiner*—Andrew V. Kundrat
*Attorney, Agent, or Firm*—Walter C. Vliet; Robert F. Palermo

[57] ABSTRACT

An adjusting nut for axially positioning a rotatable member on a shaft relative to the housing includes an annular nut member with two opposed radial slots dividing the annular nut into thick and thin cantilevered portions. The thin cantilevered portion is resiliently axially displaceable relative to the thick portion. An actuating screw in a threaded through hole axially through the center of the cantilevered portion can be tightened to clamp the adjusting nut threads onto threads in the housing.

6 Claims, 1 Drawing Sheet

LOCKABLE NUT FOR AXIAL ADJUSTMENT

FIELD OF THE INVENTION

This invention relates to a threaded adjusting nut which is lockable on the threads used to adjust the axial spacing between rotating and stationary parts for example.

BACKGROUND OF THE INVENTION

It is often desirable and many times necessary to fix the axial clearances in rotating machines during the assembly steps rather than during the manufacturing steps. This relaxes the tolerance control required during the manufacturing of the various components. The axial clearances between a high speed rotating part and a stationary housing for example may be extremely tight. Attempting to manufacture the various components with precise tolerances result in high manufacturing costs due to tolerance build-up. Alternatively, manufacturing the components with relaxed tolerances but having a means for precisely adjusting the clearances during the assembly step usually is more cost effective.

Various types of positioning nuts have been used to provide axial adjustment during the assembly steps. Usually an adjusting mechanism moves one component axially along a shaft to provide the proper clearance. Then the adjusting means and component are locked onto the shaft to keep the component in the correct clearance position.

One known lockable nut which could be used as a positioning means is disclosed in U.S. Pat. No. 4,557,652. This patent discloses a nut having two annular parts axially connected by resilient plugs. Locking occurs by tightening a screw in one annular part which abuts against and axially skews the other annular part on the nut thread.

The known precision adjusting nuts tend to be complex and expensive because of the number of parts, the different materials, and the steps required to produce and install the nut. Additionally the known adjusting nuts are not suitable for certain situations. Some adjusting and locking means must be accessible and operatable from a common position. Also the adjusting mechanism must be reliably and precisely reuseable.

It is believed that the simple and inexpensive lockable adjusting nut according to the present invention resolves these problems.

SUMMARY OF THE INVENTION

It is therefore a primary object of the present invention to provide a simple and inexpensive axial adjusting nut for precisely adjusting the axial position of relatively rotating members.

Another object of the present invention is to provide a lockable adjusting nut which has minimal parts and which can be simply and efficiently made and installed.

Another object of the present invention is to provide a lockable adjusting nut which is readily adjustable and lockable from a common operating position.

Another object of the present invention is to provide a lockable adjusting nut that can be reliably locked in the desired position and disassembled and accurately reassembled without loss of reliability and precision.

In general, the foregoing objects are obtained in a annular nut member having threads on the peripheral surface and at least one radial slot extending through part of the nut to form cantilevered jaw portions permitting resilient axial displacement of those portions. An actuating screw is provided for axially displacing the cantilevered portions relative to one another so as to clamp the threads of the adjusting nut on the threads of the fixed member thereby locking the nut in position.

DETAILED DESCRIPTION OF THE INVENTION

Figure 2:
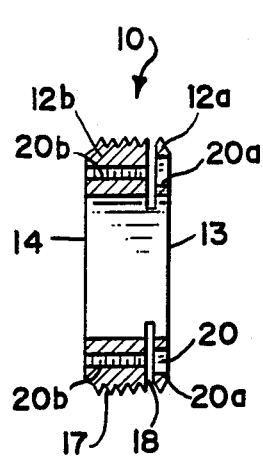
FIG. 2 is a cross sectional view of the adjusting nut of FIG. 1.
Figure 1:
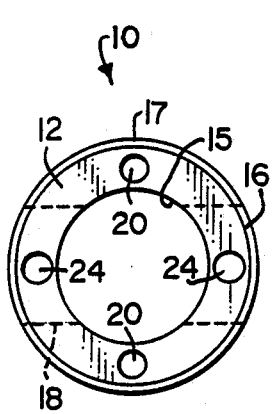
FIG. 1 is a front elevation view of the adjusting nut of the present invention.
Figure 3:
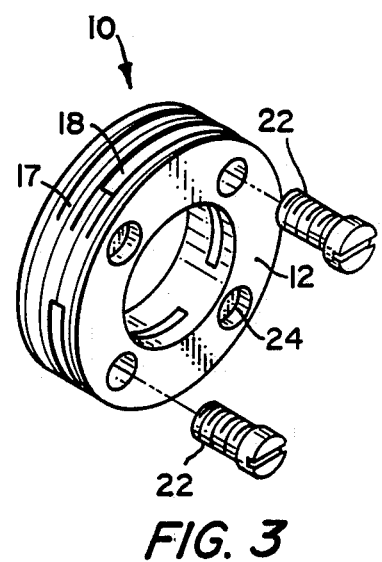
FIG. 3 is a perspective view of the adjusting nut according to the invention.

Referring now to the drawings, wherein like reference numerals designate identical or corresponding parts throughout the several views, and more particularly to FIGS. 1, 2, and 3, a preferred embodiment of the lock nut according to the present invention will now be described The adjusting nut 10 is essentially an annular member 12 preferably of a hardenable material having flat front 13 and back 14 faces, an inner diameter bore 15, and an outer diameter surface 16. In the preferred embodiment, the outer diameter surface 16 is threaded 17 in such a manner so as to cooperate with the threads of a complimentary sized hole in which the outer diameter of the nut is adapted to fit. In an alternative embodiment, the inner diameter bore surface could be threaded and would cooperate with a threaded outer peripheral surface such as a shaft.

At least one radial slot 18 and preferably a pair of opposed radial slots extend partially through the annular member 12. The slots 18 are cut through the threaded outer diameter surface 16 and are perpendicular to the axis of the bore so as to form cantilevered jaw portions 12A and 12B. The slots are preferably located closer to the front nut face 13 so that the cantilevered jaw portions 12A and 12B have different axial thicknesses. The thinner jaw portion 12A is resiliently deflectable relative to the thicker portion 12B. The slot 18 is cut to the necessary radial depth to permit resilient axial deflection of the thinner jaw portions yet retain the structural integrity of the annular ring.

A through hole 20 is axially disposed through the center of each cantilevered portion. The portion of the hole designated 20B through the thicker jaw portion 12B is threaded. A locking screw 22 having a head with a larger diameter than the hole 20A bridges the radial slot 18 and joins the two cantilevered jaw portions. The diameter of the hole 20A through the thinner jaw portion 12A provides non-engaging clearance for the screw threads. Tightening of the lock screw 22 will cause the thinner cantilevered jaw portion 12A to axially displace or deflect relative to the thicker jaw portion 12B.

A pair of holes 24 are provided on the front face of the annular ring member to allow the adjusting nut 10 to be rotated into position by a spanner wrench. The locking screw 22 is operable from the front face also.

Figure 4:
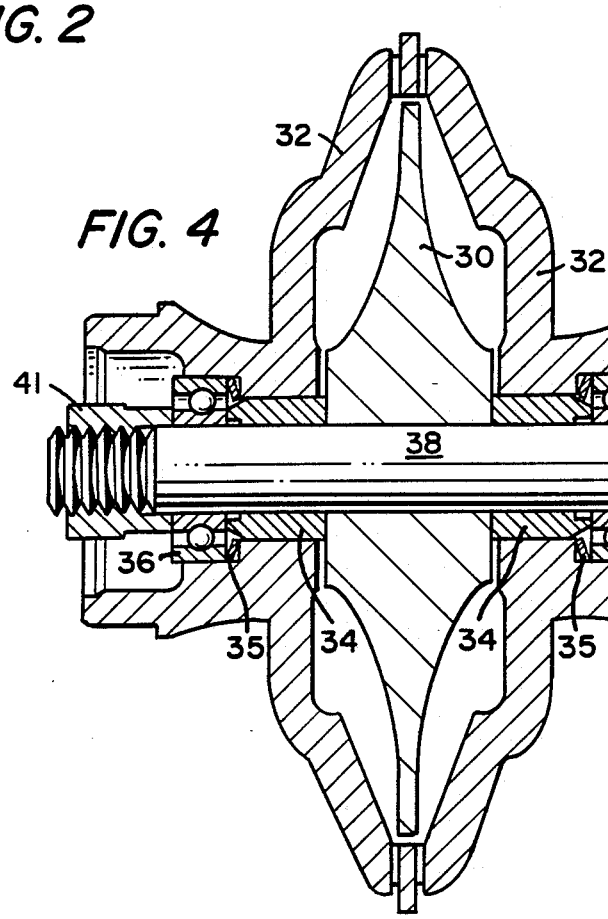
FIG. 4 is a cross sectional view of the adjusting nut in use in a typical rotating machine situation.

As seen in FIG. 4, adjusting nut 10 can be used to axially position a rotating part such as a rotor 30 relative to a housing or stator 32. The rotor 30 is sandwiched between spacers 34, bearings 36, housing members 32, and bearing nuts 41 on a rotatable shaft 38. Resilient members 35 are also provided. These members are dome or wave washers which exert spring forces when clamped.

When bearing nuts 41 are tightened on threads 42 of shaft 38, the rotor 30, both spacers 34, both bearings 36, and both nuts 41 form a rigid stack. There is no room for relative movement among these components. Spacers 34 are free to move axially in the bores of stators 32. They are only prevented from so moving by the resilient members 35 which are deformably clamped between bearings 36 and the bore shoulders of stators 32. Because of this clamping, the rotor is centered between the opposing spring tension forces exerted by resilient members 35. The adjusting nut 10 is slipped over the shaft 38 and rotated onto the mating threads 40 on the housing 32. The adjusting nut 10 is rotated until the rotor 30 moves axially to the proper clearance distance from the stationary housing 32. Movement of the adjusting nut 10 is translated to the rotor 30 by the bearing 36 and the spacer 34. By appropriate selection of spacers 34 and resilient members 35, the axial location of rotor 30 is biased toward adjusting nut 10. Thus, when adjusting nut 10 is tightened against the outer race of bearing 36, it further compresses the proximal resilient member 35 and partly relaxes the compression on distal resilient member 35. Once the desired spacing is achieved, the lock screws 22 are tightened which resiliently deflects the thin jaw section 12A of the cantilevered portion. This causes the peripheral threads 17 on the jaw portion 12A to clamp or wedge against the peripheral threads 40 in the housing member. This clamping force prevents the adjusting nut 10 from further axial movement and thus maintains the correct clearance between the rotor and stator.

The positioning of the housing members 32 relative to the rotatable shaft 38 is initially set by end pieces 41 which are threadingly engaged with the rotatable shaft 38 by means of threads 42. Adjusting nut 10 is then utilized to appropriately preload the bearing members in the manner described.

The annular member 12 of the present invention can be inexpensively machined from a single piece of stock material The lock screws 22 are commonly available. In use, the adjusting and locking operations are both performed axially from the front face of the nut. Also the adjusting nut of the present invention can be reused many times without loss of reliability.

Modifications and variations of the present invention such as threading the inner diameter of the adjusting nut are possible in light of the above teachings. It is therefore to be understood that the invention may be practiced other than as specifically described herein and it is intended that the invention be limited only by the language of the following claims:

I claim:

1. A system for centering a rotating member between first and second stationary housing members comprising:
   a shaft rotatable with said rotating member and having first and second ends;
   first and second bearings, one bearing positioned on each side of said rotating member so as to support said shaft for rotation relative to said first and second stationary housing members;
   first and second spacer members, one spacer member positioned abutting each side of said rotating member so as to axially space each bearing from said rotating member;
   first and second resilient members, one resilient member axially positioned between each bearing and stationary housing member inboard of said bearing and outboard of said housing so as to bias each bearing axially away from said housing member;
   an end piece on each end of said shaft so as to fix the outward position of each bearing and spacer member; and
   an adjusting member adjustably engaged with said second stationary housing member and in abutting contact with said second bearing so as to adjust the outward position of said second bearing and spacer member relative to said second stationary housing member.

2. The centering system of claim 1 wherein the adjusting member further comprises means for locking said adjusting member in axial position with said second stationary housing member.

3. The centering system of claim 2 wherein the adjusting member further comprises:
   an annular nut having a threaded outer circumferential surface in mating contact with a complimentary threaded bore in the second stationary member;
   at least one radially extending slot through the annular nut so as to divide the annular nut into cantilevered portions which permit resilient axial displacement of one cantilevered portion relative to the other cantilevered portion;
   an axial hole through both cantilevered portions having an oversized segment and a threaded segment; and
   an actuating screw disposed through the oversized segment of one cantilevered portion into threaded engagement with the threaded segment of the other cantilevered portion such that the cantilevered portions can be displaced relative to one another when the screw is advanced through the threaded segment.

4. An adjuster system for the axial location of a rotating member within a stationary housing comprising:
   a shaft rotatable with said rotating member and supported by bearing means; having an interior and an exterior face;
   first bore means in said housing adapted to slidably receive the outer race of said bearing means and said first bore means having a shoulder against which said interior face of said bearing means rests;
   spacer means disposed to establish a fixed spatial relationship between said rotating member and said bearing means;
   means for securing said bearing means, said spacer means, said rotating member, and said shaft in an axially rigid assembly;
   resilient members interposed between said bearing means and said shoulder in said bearing bore means so that said rotating member is supported in said housing in an axially resilient manner; and
   an adjusting nut threadably engaged with the inside diameter of a second coaxial bore in said housing, outboard and axially adjacent to said bearing bore means, so that when said nut is threaded against said bearing, said axially rigid assembly is axially displaced against the spring force provided by said resilient members until said rotating member is properly positioned within said housing.

5. The adjuster, according to claim 4, further comprising locking means to prevent further movement of said adjuster after said rotating member is properly located.

6. The adjuster, according to claim 5, wherein said locking means comprises:

at least one tangential slot extending from the outside diameter of said adjuster slightly past the inside diameter and axially located so as to form a thin section and a thick section adjacent to said slot;

at least one hole centered on the annular face of said adjuster and on said tangential slot, said hole being threaded in the thick section of said adjuster and diametrically relieved in the thin section;

at least one headed bolt sized to slide through said diametrically relieved hole in said thin section and to threadably engage said threaded hole in said thick section so that, when tightened, said bolt forces said thin section toward said thick section to jam said threads of said adjuster within said threads of said second coaxial housing bore.

* * * * *